US012727051B2

(12) United States Patent
Henson

(10) Patent No.: US 12,727,051 B2
(45) Date of Patent: Sep. 1, 2026

(54) SYSTEMS AND METHODS FOR ADVANCED LINK MANIPULATION

(71) Applicant: CACI, Inc.—Federal, Reston, VA (US)

(72) Inventor: Edward Fredrick Henson, Reston, VA (US)

(73) Assignee: CACI, Inc.—Federal, Reston, VA (US)

(*) Notice: Subject to any disclaimer, the term of this patent is extended or adjusted under 35 U.S.C. 154(b) by 982 days.

(21) Appl. No.: 17/972,838

(22) Filed: Oct. 25, 2022

(65) Prior Publication Data

US 2023/0254930 A1 Aug. 10, 2023

Related U.S. Application Data

(60) Provisional application No. 63/307,384, filed on Feb. 7, 2022.

(51) Int. Cl.

| | |
|---|---|
| ***H04W 76/20*** | (2018.01) |
| ***H04L 9/40*** | (2022.01) |
| ***H04L 41/0686*** | (2022.01) |
| ***H04L 43/04*** | (2022.01) |
| ***H04L 43/16*** | (2022.01) |
| ***H04W 12/06*** | (2021.01) |
| ***H04W 48/20*** | (2009.01) |
| ***H04W 74/0816*** | (2024.01) |
| *H04W 84/12* | (2009.01) |

(52) U.S. Cl.

CPC ......... *H04W 76/20* (2018.02); *H04L 41/0686* (2013.01); *H04L 43/04* (2013.01); *H04L 43/16* (2013.01); *H04L 63/0227* (2013.01); *H04L 63/0272* (2013.01); *H04L 63/302* (2013.01); *H04W 12/06* (2013.01); *H04W 48/20* (2013.01); *H04W 74/0816* (2013.01); *H04W 84/12* (2013.01)

(58) Field of Classification Search

None

See application file for complete search history.

(56) References Cited

U.S. PATENT DOCUMENTS

| | | | |
|---|---|---|---|
| 8,856,910 B1 | 10/2014 | Rostami-Hesarsorkh et al. | |
| 11,677,668 B1 | 6/2023 | Urias et al. | |
| 2010/0142382 A1 | 6/2010 | Jungck et al. | |
| 2013/0318345 A1 | 11/2013 | Hengeveld | |
| 2014/0282967 A1 | 9/2014 | Maguire et al. | |
| 2016/0127947 A1* | 5/2016 | Bhanage ............. | H04W 74/002 370/328 |
| 2018/0295538 A1* | 10/2018 | Monajemi ......... | H04W 28/0252 |

(Continued)

OTHER PUBLICATIONS

Z. Cui, A. Arguala, WiFi Localization Based on IEEE 802.11 RTS/CTS Mechanism, pp. 1-11 (Year: 2015).*

(Continued)

*Primary Examiner* — Christopher M Crutchfield

(74) *Attorney, Agent, or Firm* — BakerHostetler

(57) ABSTRACT

A system may be configured to: obtain one or more attributes of an RF environment of a user device; detect that the user device is neither associated with any AP nor authenticated; after the detection, stimulating the user device to be associated with at least one AP and authenticated to respond to an RTS PDU with a CTS PDU; receive the CTS PDU; and after the reception, adjust an RF link with which the user device is currently connected to operate at one or more different frequencies.

18 Claims, 7 Drawing Sheets

(56) References Cited

U.S. PATENT DOCUMENTS

| | | | | |
|---|---|---|---|---|
| 2019/0058730 | A1 | 2/2019 | Fu | |
| 2019/0110172 | A1 | 4/2019 | Strong et al. | |
| 2019/0268305 | A1 | 8/2019 | Xu et al. | |
| 2019/0274079 | A1* | 9/2019 | Bhumkar | H04W 36/0011 |
| 2020/0084265 | A1 | 3/2020 | Deen et al. | |
| 2020/0273040 | A1 | 8/2020 | Novick et al. | |
| 2020/0296136 | A1 | 9/2020 | Liu et al. | |
| 2020/0314107 | A1 | 10/2020 | Joshi et al. | |
| 2021/0099253 | A1* | 4/2021 | Kim | H04L 1/1607 |
| 2022/0103525 | A1 | 3/2022 | Shribman et al. | |
| 2022/0278874 | A1 | 9/2022 | Gabay et al. | |
| 2023/0049690 | A1 | 2/2023 | Ponaka et al. | |
| 2023/0073868 | A1* | 3/2023 | Nayak | H04W 74/0816 |
| 2023/0084349 | A1 | 3/2023 | Gabay et al. | |

OTHER PUBLICATIONS

D. Felsch et al., "The Dangers of Key Reuse: Practical Attacks on IPsec IKE", 27th USENIX Security Symposium Baltimore, MD, 2018, pp. 567-583.

L. Deri et al., "nDPI: Open-source high-speed deep packet inspection", International Wireless Communications and Mobile Computing Conference (IWCMC), Nicosia, 2014, pp. 617-622.

Chaoqun et al., "Research on Voip-Over-Vpn s Classification and Mitigation", In 2022 8th International Conference on Information Management (ICIM), 2022, pp. 63-67.

Deri et al., "Monitoring IoT Encrypted Traffic with Deep Packet Inspection and Statistical Analysis", In 2020 15th International Conference for Internet Technology and Secured Transactions (ICITST), 2020, pp. 1-6.

* cited by examiner

SYSTEMS AND METHODS FOR ADVANCED LINK MANIPULATION

CROSS-REFERENCE TO RELATED APPLICATIONS

This application claims the benefit of U.S. Provisional Application No. 63/307,384 filed on Feb. 7, 2022 and entitled "Cyber Security Systems and Methods," the content of which is incorporated by reference herein in its entirety.

TECHNICAL FIELD

The present disclosure generally relates to systems and methods for performing network stimulation, band steering, development of information on a target device, and enablement of one or more cyber operations.

BACKGROUND

Wireless access points (APs) may implement multiple basic service set identifiers (BSSIDs) using dual 2.4 and 5 GHz radios. When within an optimal range of the AP, user devices may communicate via the 5 GHz BSSID for increased throughput and performance. 802.11 (Wi-Fi) networks present difficulty in conducting cyber operations due to low transmit power, aloha-based media access, sporadic transmissions, and high attenuation in comparison to cellular networks or technologies. Ready-to-send (RTS) protocol data units (PDUs) and clear-to-send (CTS) PDUs are known to be implemented for communicating at the former networks. There is thus a need to control an environment of networking infrastructure, e.g., via advanced link manipulation.

SUMMARY

Systems and methods are disclosed for conducting and/or enabling cyber operations, e.g., via such wireless means as microwave communications, Wi-Fi, or another radio frequency (RF) protocol. Accordingly, one or more aspects of the present disclosure relate to a method for: obtaining one or more attributes of an RF environment of a user device; detecting that the user device is neither associated with any AP nor authenticated; after the detection, stimulating the user device to be (i) associated with at least one AP and (ii) authenticated to respond to an RTS PDU with a CTS PDU; receiving the CTS PDU; and after the reception, adjusting an RF link with which the user device is currently connected to operate at one or more different frequencies.

The method is implemented by a system comprising one or more hardware processors configured by machine-readable instructions and/or other components. The system comprises the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features may be apparent from the following description, including the drawings and claims.

The drawings, though, are for the purposes of illustration and description only and are not intended as a definition of the limits of the disclosure.

DETAILED DESCRIPTION

Figure 1:
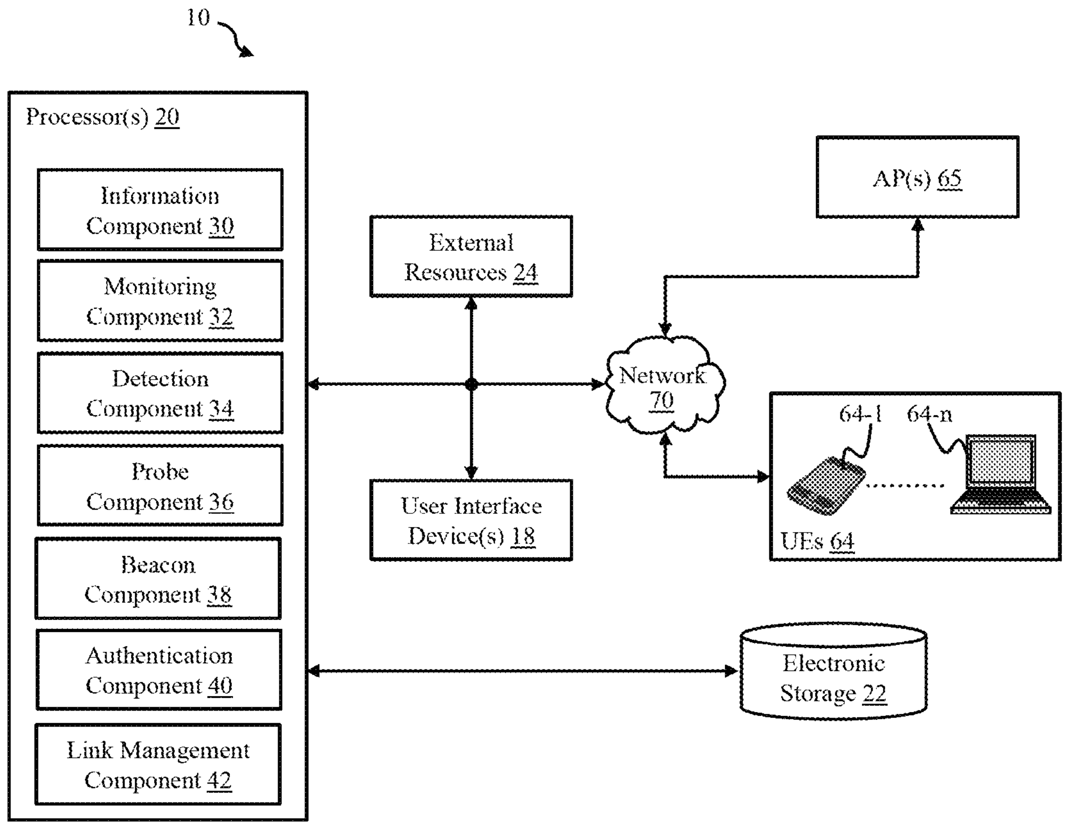
FIG. 1 illustrates an example of a system in which stimulation, band steering, target development, and/or other cyber operations may be enabled, in accordance with one or more embodiments.

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

In some embodiments, processor 20 may be configured for RF link management. For example, at least one of information component 30, monitoring component 32, detection component 34, probe component 36, or beacon component 38 may utilize stimulation techniques to confirm presence of UE 64 in a region of interest (ROI), such as an operating environment. Such component(s) may further be configured to provide high penetration assistance for geolocation. Detection component 34 may send an RTS PDU to UE 64, and a component of processor 20 may listen for the response in a CTS PDU.

In an embodiment, unassociated UE 64 may not normally acknowledge reception of RTS PDUs. For these UEs, probe component 36 may generate and transmit an association/probe response to UE 64's probe request, causing UE 64 to move into an active state. Detection component 34 may then perform an RTS/CTS stimulation sequence, as in the example of FIG. 2.

According to another embodiment of this aspect, authentication component 40 may also be able to force association for certain chipsets through taking advantage of vulnerabilities within UE 64's association state machine. Authentication component 40 may transmit an unsolicited authentication response and/or an unsolicited association response, which may move UE 64 to a state where it may respond to RTS PDUs.

In some embodiments, information component 30 may be configured to determine whether maintenance of a link may be effected (e.g., based on link budgets and/or other RF condition(s)). And link management component 42 may be configured to enable the maintenance of the link or initially establish the link. As such, reliable cyber operations may be performed. For example, contemplated planning operations may include information component 30 being involved in feasibility analysis, determining whether UE 64 is in an ROI, and/or determining an attribute of the link of UE 64 (e.g., whether the Wi-Fi is operating at 5 GHz) based on prior collection.

In some embodiments, link management component 42 may adjust a wireless (e.g., RF or microwave) attribute (e.g., lower frequency), e.g., enabling a longer range or distance (e.g., from an AP). For example, upon information component 30 confirming UE 64 is in the ROI, link management component 42 may be configured to move one or more UEs to a frequency range via which it may be easier or more feasible to conduct the operation.

In some embodiments, at least one of probe component 36, beacon component 38, or authentication component 40 may implement the herein-contemplated stimulation, e.g., to enable UE 64 to communicate (e.g., at network 70 or another network accessible via processor 20).

As used herein, UE may be considered a target device, client device, and/or a user device. UE 64 may communicate over each other, and their PDUs may collide (e.g., causing interference) based on one or more network conditions. UE 64 are known to support RTS/CTS PDUs, being standardized protocol in their PHY (chipset), e.g., by asking for permission before starting communicating. For example, detection component 34 may send an RTS PDU and wait for a CTS PDU response.

In an example, UE 64 may be at a location, such as a coffee shop (e.g., offering free Wi-Fi). While connected to AP 65, detection component 34 may emit an RTS to UE 64, and that UE may then respond with a CTS. But if UE 64 is not currently connected (e.g., a Wi-Fi connection) to a base station or AP, the UE may not respond.

In some embodiments, contemplated embodiments include Wi-Fi implemented via slotted, additive links online Hawaii area (ALOHA) technology (e.g., random-access channel).

Figure 3:
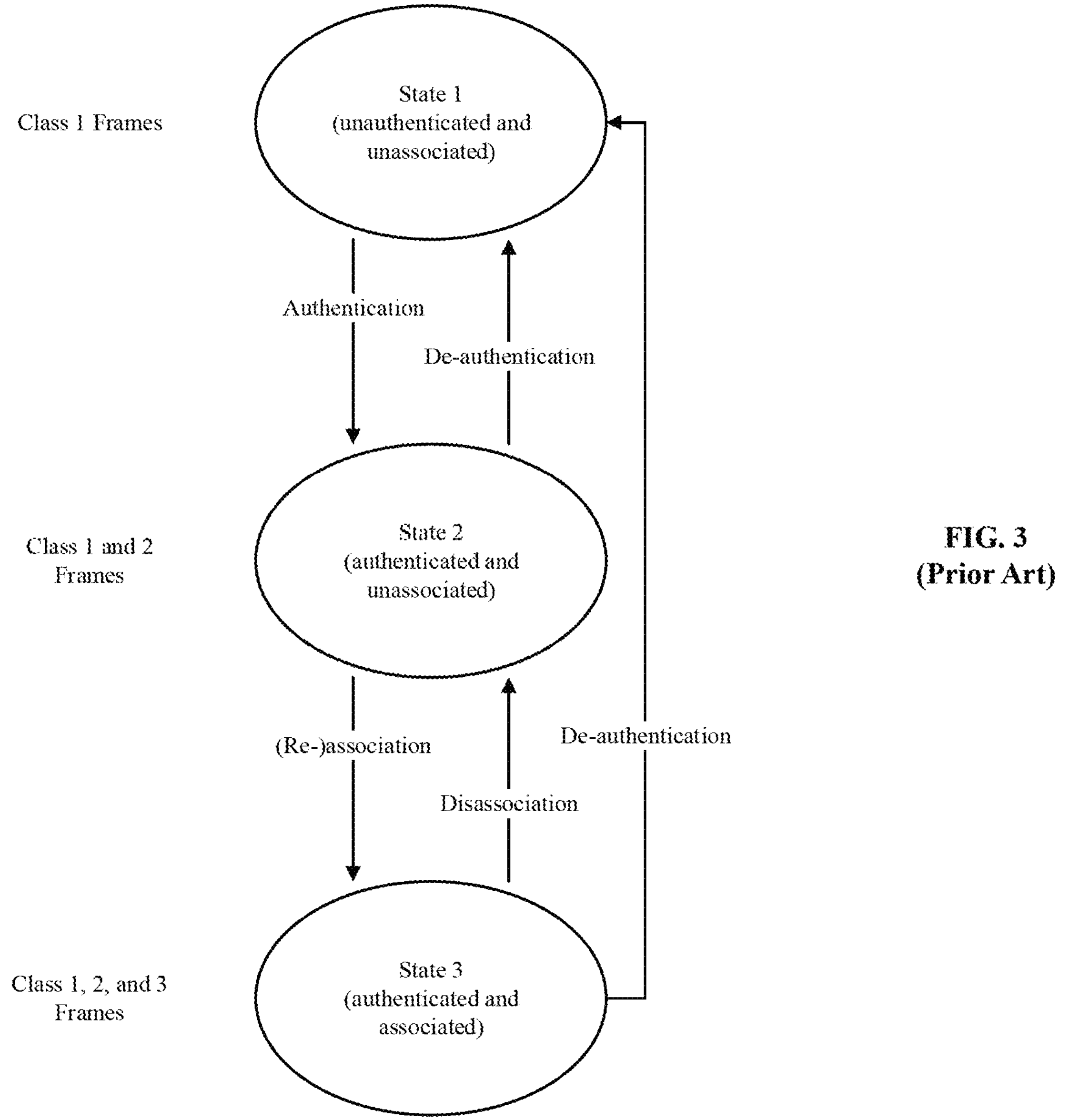
FIG. 3 illustrates an association state machine, in accordance with the prior art.

FIG. 3 depicts an example state machine for the 802.11 protocol/standard or Wi-Fi. In this example, UE 64 may be in state 1, which may represent it being unauthenticated and unassociated. In some implementations, UE 64 may be pre-configured to support RTS and CTS PDUs, e.g., with one or more of these PDUs being at least considered a class 1 frame. But in actuality many or most UE 64 may not respond to an RTS PDU.

At state 2, UE 64 may be considered authenticated but still unassociated. For example, UE 64 may not send or respond to association frames, when not already authenticated. In some implementations, as depicted in FIG. 3, class 1 frames and some class 2 frames (e.g., management or association frames) may be emitted at or in relation to state 2. And at state 3, UE 64 may be authenticated and associated. For example, data frames may also be emitted, when in state 3.

Most networking equipment (e.g., which may be comprised in UE 64) does not support responding to an RTS, when in state 1. Although a state machine for the 802.11 specification may indicate performance of class 1 frames when in state 1, in actuality this not known to be generally true. Detection component 34 and/or probe component 36 may thus be configured to stimulate or otherwise manipulate such UE to traverse the state machine to get to state 3 such that, when emitting to it an RTS PDU, it may respond with a CTS PDU.

UE 64 may be associated to an AP implementing 802.11, but the UE may not actively be utilizing the connection (e.g., not currently or only sporadically requesting or emitting network traffic) other than occasional background update checks. It may be difficult to determine whether one or more UEs 64 is in a given area. And geolocation may also be more challenging, e.g., receiving multiple PDUs at different points in relation to the UE to specifically triangulate them (e.g., identifying coordinates). Multiple transmissions may be needed for determining ranging information. For example, when intending to geolocate UE 64, this UE may need to be communicating as much as possible, and/or information component 30 may need to perform mission planning (e.g., pattern-of-life analysis) to predict with a certain probability whether that UE is going to be in an ROI at a certain time of day.

In some embodiments, detection component 34 may perform stimulation, e.g., to solicit additional transmissions from the device. An RTS PDU (e.g., of 802.11) may be sent to UE 64, which may respond with a CTS PDU. However, this technique may only work if UE 64 is currently associated to an AP. UEs 64 implementing 802.11 PHYs may not emit or respond to class 1 frames, such as RTS/CTS PDUs, when they are not associated.

Since there is no guarantee that UE 64 is connected to AP 65, detection component 34 may stimulate unassociated UE 64. When UE 64 (e.g., implementing the 802.11 protocol) is unassociated, it may transmit a probe request that contains the SSID of a desired or candidate AP. In some embodiments, probe component 36 may begin association operations by generating and transmitting a probe response towards UE 64. With APs 65 that were previously connected to UE 64 being known, beacon component 38 may broadcast beacons to elicit UE 64 to begin associating. Once the association process has been spoofed, the RTS/CTS protocol may be performed against UE 64.

Certain chipsets have firmware versions that may be susceptible to state machine attacks. For example, after the reception of an unsolicited association response for a known prior connected SSID, the state machine may move into an associated state. This allows for performing RTS/CTS techniques with minimal state machine manipulation.

In other words, one or more UE 64 may have a chipset provided and/or manufactured by a vendor that is detected by analyzing the MAC address of the respective UE and identifying each as an organizationally unique identifier (OUI). For example, the vendor may be assigned one or more OUIs, which may comprise the first 24 bits of the MAC address. UE 64 associated with an OUI may have a vulnerability in that their state machine may result in responding to an association frame even though this UE is still in state 1.

Figure 2:
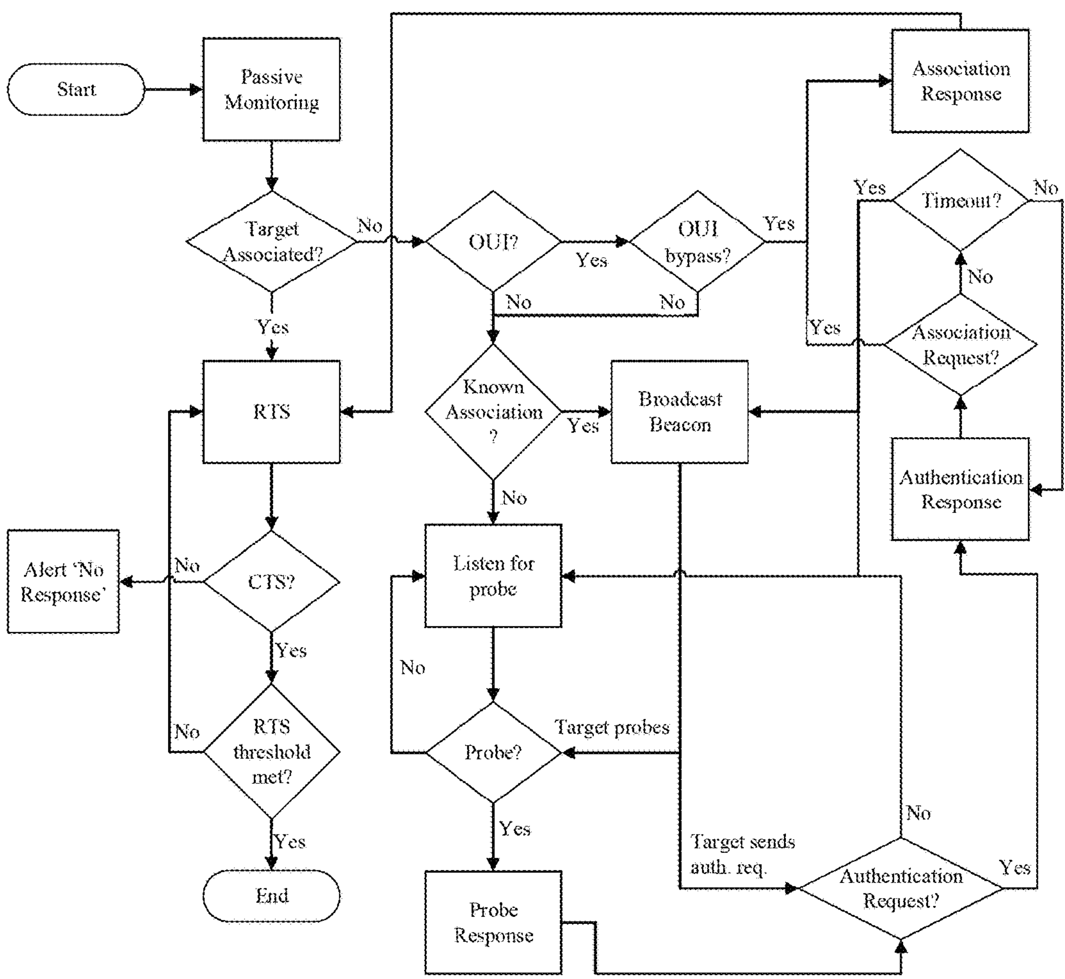
FIG. 2 illustrates a process for stimulating UEs, in accordance with one or more embodiments.

In some embodiments, information component 30 may perform an OUI lookup (e.g., using one or more publicly available databases) and/or utilize a result thereof to determine whether UE 64 is associated with the vendor. For example, if processor 20 is configured to implement OUI bypass (e.g., as depicted in FIG. 2), detection component 34 may emit an association response to UE 64. Reception of such emitted response may cause UE 64 to move into an associated state (e.g., state 3), which may allow for the UE to respond to an RTS PDU with a CTS PDU. In some implementations, if UE 64 does not respond with a CTS PDU (e.g., in a time interval), detection component 34 may again emit to the UE an association response. The herein-disclosed approach may take advantage of a state machine vulnerability associated with implementations of a specific vendor (e.g., based on an OUI), e.g., by detection component 34 directing UE 64 to skip one or more steps, when unassociated, enabling a quick association in moving to state 3 for responding to a received RTS PDU.

Being able to perform RTS/CTS is imperative for active offensive cyber operations, in which the operator is transmitting an effect (e.g., to elicit some information from the UE, to emit information to it, or otherwise stimulate some sort of action thereat). Since RF-enabled cyber effects are observable within the area of operation, projected RF metrics must first be ascertained before committing to the (e.g., exploitative) cyber operation. For example, ranging and/or signal strength information may be ascertained when performing mission planning, by emitting and receiving RTS and CTS PDUs, respectively. In this or another example, monitoring component 32 may know that processor 20 may successfully take part in an operation over Wi-Fi, e.g., when the minimum signal strength of the link is at or above a threshold.

Contemplated cyber operations may require sufficient level(s) of network reliability, predictability, and/or controllability. Otherwise, if a reliable connection cannot be predicted, then processor 20 may broadcast to adversaries, substantially reducing a probability of future success in connecting to that UE. Due to the sensitive nature of these or other cyber operations, link management component 42 may manage conditions, e.g., to ensure reliability of end effects. For example, a risk of failure may be reduced, e.g., ensuring that capabilities are not needlessly burnt (e.g., without a covert or exploitative cyber operation being detected and reported to leadership of the adversary, target UE).

RTS/CTS allows for a confirmation that UE 64 is within an ROI or field of view and an evaluation of 802.11 signal strength, while minimizing the number of emitted PDUs. This may allow for tradecraft (e.g., utilizing capabilities to protect the operation and/or themselves, such as emissions control (EMCON), by emitting as little as needed to accomplish an act) to be implemented, reducing the risk of the operator being located or detected by an adversary or of tipping off UE 64 or foreign intelligence services prior to the operation. Transmission of an authentication frame is risky, as it may expose the operator.

In some implementations, processor 20 may perform other stimulation for geolocating UE 64, by obtaining information (e.g., from multiple points) of the user device to determine ranging information based on signal strength. But these UE may initially need to be communicating, e.g., for success of this other stimulation.

In some implementations, multiband AP 65 may have a same SSID, when implementing both at 2.4 and 5 GHz. And then on network 70 this AP may implement 802.11b. As such, UEs 64 that connect to it may move to whatever connection (e.g., 5 GHZ) is best for them (e.g., based on signal strength) and stay in that configuration for optimal throughput and/or speed. But, when this UE gets closer to the edge of that range, they may automatically transition to a 2.4 GHz connection to maintain service.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface (UI) device 18, processor 20, etc.). In some embodiments, electronic storage 22 may be located in a server together with processor 20, in a server that is part of external resources 24, in UI devices 18, and/or in other locations. Electronic storage 22 may comprise a memory controller and one or more of optically readable storage media (e.g., optical disks, etc.), magnetically readable storage media (e.g., magnetic tape, magnetic hard drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via UI devices 18 and/or other external computing systems, information received from external resources 24, and/or other information that enables system 10 to function as described herein.

External resources 24 may include an antenna, e.g., an omnidirectional antenna or a parabolic (point to point) dish. In that or another example, external resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply (e.g., battery powered or line-power connected, such as directly to 110 volts AC or indirectly via AC/DC conversion), a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 24 may be provided by other components or resources included in system 10.

Processor 20, external resources 24, UI device 18, electronic storage 22, a network, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN), etc.), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

UI device(s) 18 of system 10 may be configured to provide an interface between one or more users and system 10. UI devices 18 are configured to provide information to and/or receive information from the one or more users. UI devices 18 include a UI and/or other components. The UI may be and/or include a graphical UI configured to present views and/or fields configured to receive entry and/or selection with respect to particular functionality of system 10, and/or provide and/or receive other information. In some embodiments, the UI of UI devices 18 may include a plurality of separate interfaces associated with processors 20 and/or other components of system 10. Examples of interface devices suitable for inclusion in UI device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that UI devices 18 include a removable storage interface. In this example, information may be loaded into UI devices 18 from removable storage (e.g., a smart card, a flash drive, a removable disk) that enables users to customize the implementation of UI devices 18.

In some embodiments, UI devices 18 are configured to provide a UI, processing capabilities, databases, and/or electronic storage to system 10. As such, UI devices 18 may include processors 20, electronic storage 22, external resources 24, and/or other components of system 10. In some embodiments, UI devices 18 are connected to a network (e.g., the Internet). In some embodiments, UI devices 18 do not include processor 20, electronic storage 22, external resources 24, and/or other components of system 10, but instead communicate with these components via dedicated lines, a bus, a switch, network, or other communication means. The communication may be wireless or wired. In some embodiments, UI devices 18 are laptops, desktop computers, smartphones, tablet computers, and/or other UI devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol version 4 (IPv4) and Internet Protocol version 6 (IPv6).

In some embodiments, processor(s) 20 may form part (e.g., in a same or separate housing) of a user device, a consumer electronics device, a mobile phone, a smartphone, a personal data assistant, a digital tablet/pad computer, a wearable device (e.g., watch), augmented reality (AR) goggles, virtual reality (VR) goggles, a reflective display, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, a monitor, a television (TV), a panel, a space craft, or any other device. In some embodiments, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, UI devices 18, devices that are part of external resources 24, electronic storage 22, and/or other devices).

As shown in FIG. 1, processor 20 is configured via machine-readable instructions to execute one or more computer program components. The computer program components may comprise one or more of information component 30, monitoring component 32, detection component 34, probe component 36, beacon component 38, authentication component 40, link management component 42, and/or other components. Processor 20 may be configured to execute components 30, 32, 34, 36, 38, 40, and/or 42 by: software; hardware; firmware; some combination of software, hardware, and/or firmware; and/or other mechanisms for configuring processing capabilities on processor 20.

It should be appreciated that although components 30, 32, 34, 36, 38, 40, and 42 are illustrated in FIG. 1 as being co-located within a single processing unit, in embodiments in which processor 20 comprises multiple processing units, one or more of components 30, 32, 34, 36, 38, 40, and/or 42 may be located remotely from the other components. For example, in some embodiments, each of processor components 30, 32, 34, 36, 38, 40, and 42 may comprise a separate and distinct set of processors. The description of the functionality provided by the different components 30, 32, 34, 36, 38, 40, and/or 42 described below is for illustrative purposes, and is not intended to be limiting, as any of components 30, 32, 34, 36, 38, 40, and/or 42 may provide more or less functionality than is described. For example, one or more of components 30, 32, 34, 36, 38, 40, and/or 42 may be eliminated, and some or all of its functionality may be provided by other components 30, 32, 34, 36, 38, 40, and/or 42. As another example, processor 20 may be configured to execute one or more additional components that may perform some or all of the functionality attributed below to one of components 30, 32, 34, 36, 38, 40, and/or 42.

In some embodiments, operations of the contemplated stimulation, via monitoring component 32, may involve passive monitoring of 802.11 traffic, e.g., to determine whether UE 64 (identified by MAC address) is currently associated. For example, this component may detect whether there is bidirectional traffic between UE 64 and another UE. If the detection indicates bidirectional traffic, the MAC address of the other UE may be monitored to determine if it is an AP. APs 65 may be identified by bidirectional traffic to multiple end points or user devices or by the broadcast of beacon frames. If UE 64 is connected to AP 65, it may be in an associated state.

In some embodiments, operations of the contemplated stimulation, via detection component 34, may involve RTS/CTS PDUs. For example, UEs 64 in an associated state may be stimulated through transmitting an RTS PDU, with the MAC address of UE 64 as the receiver address (RA), and an arbitrary MAC address, being the transmitter address (TA). In response, UE 64 may respond with a CTS PDU comprising the TA from the RTS PDU as the RA. The arbitrary TA in the RTS may be chosen to help distinguish individual RTS/CTS sessions for scenarios in which there are multiple concurrent UEs 64.

An arbitrary address may be, e.g., a hash value for the MAC address of UE 64 or a mission value depending on software requirement(s) in which it is implemented. As such, detection component 34 may uniquely assign an address to that specific MAC address to be able to map it back on the backend. For example, processor 20 may be attempting a cyber operation with each of a plurality of UEs 64 at a same time, knowing what each response from each UE may be. For example, the UE may respond with the address that processor 20 indicates was itself in an RTS PDU. And when a threshold is met, the contemplated process may stop to prevent an adversary from knowing a location or other information about an operator of system 10. This operator may have additional control or granularity, e.g., with respect to how many times it may iterate through an RTS/CTS procedure, based on an acceptable level of risk.

If a CTS PDU is not received in response to the RTS PDU, detection component 34 may alert lack of a response. After each iteration of RTS PDU emission, an RTS counter may be incremented. This may then be compared to a user configurable iterations' threshold (e.g., may be indefinite or infinite). If the threshold is met, then this process may stop.

In some embodiments, operations of the contemplated stimulation, via probe component 36, may involve unassociated UE. For example, unassociated UEs 64 may be moved into an associated state by moving through its association state machine. In this or another example, probe component 36 may listen for UE 64 to transmit a probe request comprising the SSID to which it intends to associate. Different Wi-Fi software of UE 64 may handle probe requests differently. Generally, UEs 64 either send the SSID of the last associated AP, the very first associated AP, or the most connected AP.

Once a probe request is received, probe component 36 may transmit a probe response comprising the SSID from the probe request. This or another component of processor 20 may listen for an authentication response. If an authentication request is not received, the component may return to listening for a probe request. If an authentication request is received, the component may emit an authentication response to the MAC address of UE 64.

In some embodiments, authentication component 40 may listen for an association request. If the request is not obtained thereof, this component may compare against a user configurable timeout. If the timeout has not been exceeded, the authentication response may be resent. If the timeout has been exceed, this component may restart the process and return to listening for probe requests or broadcasting beacons. If the association request is received, authentication component 40 may emit an association response, moving UE 64 into an associated state. At this point, the RTS/CTS procedure may be performed.

In some embodiments, operations of the contemplated stimulation, via beacon component 38, may involve a known prior association. For example, this component may have information on prior associations for UE 64. These associations may comprise the SSID (e.g., the broadcasted name of the 802.11 network) and a security configuration of the network (e.g., WPA2, WEP, open, etc.). If system 10 is configured to use a known association for an unassociated UE 64, beacon component 38 may transmit a beacon frame comprising the association information. When UE 64 receives the beacon, it may either transmit a probe for the known association or an authentication request. Reception of either PDU may start the association process at either point. In some embodiments, a component of processor 20 may be configured to broadcast the beacon indefinitely during the process or only until a PDU is received from UE 64.

In some embodiments, beacon component 38 may have performed a survey or previous collection in an area or region and may thus know the association (e.g., connection to a prior AP, including an SSID or name and a type of encryption to be used thereof). Rather than listening for a probe continually emitted by UE 64 that is directed to a previous AP (e.g., when this UE is not connected), beacon component 38 may broadcast a beacon frame for that SSID. And this UE may then attempt to connect to that candidate AP, initially via an authentication. If this component of processor 20 does not have information about previous connections of that UE, then information component 30 may perform target-development to collect probe requests and observe what SSID is in there. Authentication component 40 may then set that up for transmitting a response to it, e.g., in an authentication request.

In some embodiments, authentication component 40 generates information indicating one or more candidate APs.

In some embodiments, operations of the contemplated band steering, via information component 30 and/or monitoring component 32, may involve configurations. For example, prior to employing the capability, an operator of system 10 or a component of processor 20 may perform pre-mission analysis to determine requirements for the configuration. If the intended end state it to steer UE 64 to a locally hosted AP, the operator may configure the system with the parameter set for the AP which may comprise the BSSID, SSID, and/or channel number.

A UE's network configuration may be known beforehand, e.g., via prior conducted network surveying. If the multiband configuration of the AP is known, the system can be configured with SSIDs, BSSIDs, and/or channel information to enable skipping the passive monitoring network configuring. In an example, if information component 30 does not have sufficient information of UE 64's environment (e.g., SSID, MAC address, and/or channel of APs to which the UE is operable to connect), monitoring component 32 may survey and see all that information first in order to be able to configure the capability. In another example, that information may already have been collected at this component and then the configuration from that may be performed.

Additionally, the operator of system 10 may configure the retry attempt threshold. This value may determine the number of procedure attempts to steer UE 64 to a new BSSID before terminating the process.

In some embodiments, system 10 may also be configured for rejection bypass. When this is enabled, authentication component 40 may de-authenticates UE 64, e.g., following a BSS transition rejection. A BSS transition response may be a name of a PDU emitted to UE 64. And when authentication component 40 receives a rejection (e.g., with a value of 2), this component may cause a de-authentication.

In some embodiments, operations of the contemplated band steering, via monitoring component 32, may involve passive monitoring. For example, this component may begin by passively monitoring 802.11 traffic to identify one or more characteristics of the AP to which UE 64 is associated. This may be done by identifying bidirectional traffic between the UE and AP 65 and by extracting the BSSID (MAC address) of the access point.

Beacon frames originating from the BSSID may then be identified, and the SSID may then be parsed from the SSID parameter set within the beacon. This component may then monitors for beacon frames across all other 2.4 GHz and 5 GHz channels, e.g., to identify APs 65 utilizing the same SSID or having BSSIDs (e.g., a last character of the MAC address) within a range of 3 bits. The latter may help to identify multiband APs that utilize different SSIDs for each channel or that do not broadcast their SSID. When not connected to a multiband router, this UE may be steered to a prior known AP in an area or a hosted AP.

As mentioned, characteristics of APs 65 may be identified, including BSSIDs, SSIDs, the parameters within the beacon frame, option sets that are supported, the channel rate set, and/or another parameter. Information component 30 may cause storage of this information that the wireless router is broadcasting, to be able to have that information available.

In some embodiments, operations of the contemplated band steering, via beacon component 38, may involve transmitting a beacon. For example, if BSS transition support is not enabled within the beacon PDU of UE 64's currently associated AP, this component may prepare a mirrored beacon PDU by adding therein enablement of BSS transition support. And then this beacon PDU may be transmitted, e.g., at 1 second intervals. Although BSS transition support is known with respect to 802.11b, not all existing routers have that enabled. Beacon component 38 may thus override that extension by emitting a beacon PDU that looks like an actual beacon, except which has therein the extension set to cause its support (e.g., informing the UE that it may not be commanded to move around).

In some embodiments, operations of the contemplated band steering, via beacon component 38 and/or authentication component 40, may involve transmission of candidates (e.g., APs 65). For example, this component may listen for UE 64 to transmit a BSS transition acknowledgement. Once this acknowledgement is received, a BSS transition management request may be prepared. This PDU may comprise a list of candidate APs, e.g., with each including one or more channel numbers and one or more BSSIDs. In this or another example, beacon component 38 or authentication component 40 may assign a desired BSSID a value of 255 in a preference field, indicating a highest priority. The current associated BSSID may be assigned a value of 0, which may indicate that UE 64 should exclude it for consideration. The abridged bit may be set to a value of 0, directing UE 64 to not consider any BSSIDs within the ESSID that are not included within the provided candidate list. The BSS transition management request may further comprise a dissociation imminent value of 0, e.g., causing UE 64 to respond. This BSS transition management request frame may then be transmitted to UE 64.

In some embodiments, operations of the contemplated band steering, via beacon component 38 and/or authentication component 40, may involve a target response. For example, UE 64 may reply with a BSS transition management request, e.g., which may comprise a BSS transition management (BTM) status code. If UE 64 does not respond, this component may increment the retry attempt counter and transmit the BSS transition management request again, when the retry attempt threshold has not been exceeded.

When UE 64 responds with status code 0, the BSS termination request may be accepted, and UE 64 may dissociate from the current BSSID and associate to the directed (i.e., candidate) BSSID.

If UE 64 responds with BTM status code 2, the request may be rejected due to insufficient beacon or probe responses for the directed BSSID. beacon component 38 or authentication component 40 may then increment the retry attempt counter. And if the retry threshold has not been met and if the rejection bypass is not enabled, this component may transmit the BSS transition management request again. If rejection bypass is enabled, a de-authentication frame may be transmitted to UE 64, e.g., causing UE 64 to disassociate from its current AP, encouraging an association with the candidate AP.

In some embodiments, operations of the contemplated band steering, via authentication component 40, may involve a new AP association. For example, the new AP association of UE 64 may be confirmed. If UE 64 was steered to a different BSSID on its original multiband AP, this may be ascertained from the presence of bidirectional traffic between UE 64's MAC address and the new AP's BSSID. If UE 64 is steered towards locally hosted AP 65, this is confirmed by checking the association status within the AP.

If UE 64 is not associated to the new AP, the retry attempt counter may be incremented. If the retry attempt threshold is not exceeded, the process may reiterate by transmitting another beacon PDU.

According to another aspect, link management component 42 may implement band steering, e.g., by moving one or more UEs 64 between 2.4 GHz and 5 GHz BSSIDs, which may be part of a same ESSID. An ESSID may be an electronic marker, address, or ID of a device to connect to a wireless router or AP to then access the Internet. The settings can be either broadcast enabled (open) or broadcast disabled (closed).

When conducting close access offensive cyber operations (OCO), link management component 42 may move UEs 64 from a higher band (e.g., 5 GHZ) to a lower band (e.g., 2.4 GHz) at which a greater level of reliability is achieved. The channel rate manipulation of system 10 may allow for reducing UE 64's connection to a lower data rate, e.g., which may substantially increase an ability to collect data frames. For example, a standoff distance may be substantially increased (e.g., doubled), and a link thereof may otherwise have its reliability improved. In this or another example, beacon component 38 may first identify configuration options for the network to which UE 64 is connected. And, if BSS transition support is not transmitted in the APs extended capabilities, beacon component 38 may transmit beacons on AP 65's behalf, e.g., advertising support for BSS transition in extended capabilities flags. This example is depicted in FIG. 4.

Once UE 64 has acknowledged BSS transition capability, beacon component 38 may transmit a BSS transition management request that comprises a list of candidate APs 65, which contains channel numbers and BSSIDs. The BSSID may be based on the MAC address, in some examples. Beacon component 38 may, e.g., give the desired BSSID a value of 255 in a preference field, indicating a highest priority. The current associated BSSID may be assigned a value of 0, which indicates that UE 64 should exclude it for consideration. An abridged bit may be set to a value of 0, directing UE 64 to not consider any BSSIDs within the ESSID that are not included within the provided candidate list.

Figure 4:
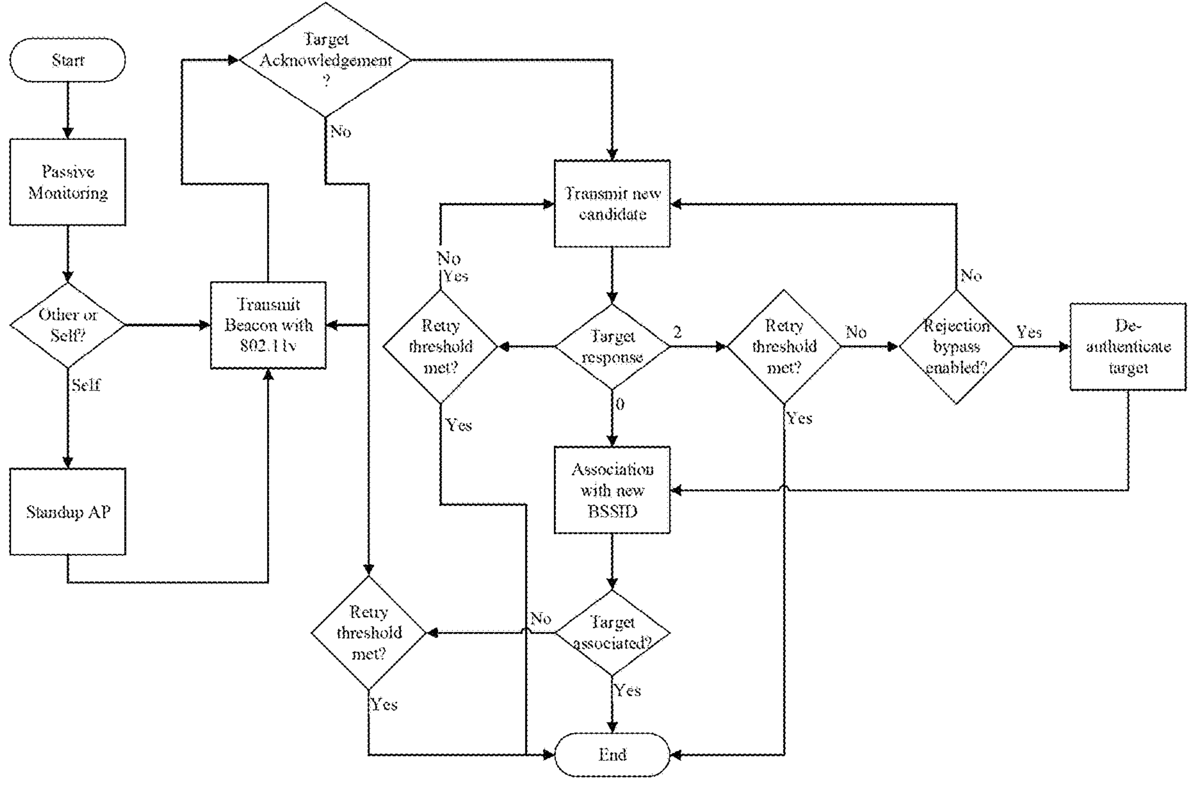
FIG. 4 illustrates a process for band-steering UEs' network connection, in accordance with one or more embodiments.

As shown in the example of FIG. 4, beacon component 38 may emit a new candidate to UE 64. For example, the MAC address of the candidate AP (i.e., with an AP stood-up by system 10 or with another AP to which an operator of this system intends to move the connection or link) may be transmitted to the UE. In some implementations, beacon component 38 may specify that this candidate has a highest priority. This specification may further comprise the MAC address of their current AP (e.g., with the value of 0, indicating a lowest priority for future links or connections).

The BSS transition management request may further comprise a dissociation imminent value of 0, e.g., causing UE 64 to respond. UE 64 may then transmit a BSS transition management request, which contains a BTM status code. For example, when UE 64 responds with status code 0, the BSS termination request may be accepted, and UE 64 may dissociate from the current BSSID and instead associate with the directed BSSID. UE 64 responding with status code 2 may indicate that the request was rejected due to insufficient beacon or probe responses for the directed (candidate) BSSID. For example, UE 64 may not yet have obtained enough frames identifying AP 65 (e.g., via beacons) or the UE may send probe requests for that AP, indicating that the UE is not getting responses to confirm that the AP is there (e.g., and with sufficient signal strength). In this case, beacon component 38 may reinitiate the BSS transition management request to repeat the procedure. If UE 64 responds with any other status code(s), the request may be considered rejected.

In some embodiments, beacon component 38 may provide a suggestion for UE 64 to transition to a connection with AP 65 (e.g., which may be different from an AP to which the UE is currently connected). When UE 64 responds with a 0, it may indicate acceptation of the suggestion, and when UE 64 responds with a 2, it may indicate rejection of the suggestion.

In implementations where beacon component 38 is configured into a rejection bypass mode, this component may transmit disassociation frames to encourage UE 64 to move to the desired BSSID. Once beacon component 38 has detected the association procedure executing using the new BSSID, such band steering may be considered at least temporarily complete. If the procedure fails, beacon component 38 may reattempt the procedure via a configurable number of iterations.

In some embodiments, link management component 42 may band-steer UE 64 to AP 65 (e.g., which may further control the AP) when used in conjunction with the AP standup capability. By mirroring the parameters of the extended service set identification (ESSID), beacon component 38 may direct UE 64 to transition to that AP (e.g., by placing the BSSID within the candidate list of the BSS transition management request).

In some embodiments, link management component 42 may implement channel rate manipulation, e.g., allowing for reducing UE 64's connection to a lower data rate and/or for substantially increasing an ability to collect data frames. The modulation and coding scheme (MCS) may be dynamically negotiated between AP 65 and UE 64, and the MCS may be based upon rates listed in the supported BSSBasicRateSet of both the AP and UE. Beacon component 38 may transmit a spoofed beacon for the BSSID containing a restricted BSSBasicRateSet. And then this component may perform the reassociation process with UE 64 to negotiate a lower data rate.

802.11 utilizes the 2.4 GHz and 5 GHz radio frequency bands, with modern APs implementing both bands concurrently and transparently. These APs implement new waveforms (e.g., 802.11ac) on the 5 GHz band and legacy protocols (e.g., 802.11n) on the 2.4 GHz band. 802.11 devices may naturally want to connect to 5 GHz APs over 2.4 GHz to have better throughput and support for modern Wi-Fi enhancements. However, higher frequencies suffer from greater attenuation than lower frequencies. When combined with higher order modulation for newer waveforms, 5 GHZ APs may have roughly half the effective range of 2.4 GHz APs. This presents a problem for both active and passive close access, or RF enabled, cyber operations.

An active (e.g., on-network) cyber operation may emit data to the UE through the Internet, and a close access cyber operation may intend to bridge the gap by better collecting data from the UE via any wireless technology (e.g., Wi-Fi, Bluetooth, 4G LTE, 5G, etc.). For example, UE 64 may move from 5 GHz to 2.4 GHz to collect everything that UE is transmitting as opposed to emitted data being intermittently lost.

In some embodiments, information component 30 may determine (e.g., plan) close access cyber operations to maximize the standoff distance, e.g., from processor 20 or area of operation, including the candidate AP, to the UE. While higher band 802.11 traffic from UE 64 may be received at a certain distance, there could be unacceptable levels of packet reception loss due to a connection being right at the receiver sensitivity threshold. Steering UE 64 to a 2.4 GHz may provide better bidirectional signal strength, resulting in a higher level of link reliability for the operation.

Additionally, the contemplated band steering technique may allow for moving UE 64 to a locally controlled AP. This may provide the ability to implement a broader range of capabilities in the exploitation of UE 64, since the architecture may be changed from a man-on-the-side methodology to a man-in-the-middle one.

As shown in the example of FIG. 4, authentication component 40 may determine (e.g., based on passive monitoring of monitoring component 32) to which AP a connection or link of UE 64 is to be moved. For example, link management component 42 or another component of processor 20 may implement, spoof, or otherwise stand-up an AP and thus system 10 may be in more control of the connection or link. In another example, this component may cause the link or connection to be moved to another AP (e.g., different from a current or previous one of a same multiband router) of an environment of the UE.

In some implementations, a response may not be obtained from UE 64, e.g., due to a wireless operation being obtained therewith and/or to link condition(s) being suboptimal. Authentication component 40 may thus reiterate, e.g., via one or more operations as in the example of FIG. 4, emission of a new candidate to the UE. For example, UE 64 may be at a threshold of its range, and via trying second or third times, e.g., the candidate may be reemitted and the response obtained. In this or another example, processor 20 may cause the UE to move from a 5 GHz connection to a 2.4 GHz one, extending its range and obtaining better quality for the connection.

Also in the example of FIG. 4 is depicted a target device (e.g., UE 64) to which may be sent a de-authentication PDU (e.g., indicating that its current association with an AP is no longer valid). As a result, UE 64 may be caused to transition to state 1, and when in that state the UE may select a new AP 65 seeded via a suggestion provided by processor 20 that gives that new AP a higher priority than that of its currently associated AP. By being put into the unassociated state, UE 64 may be encouraged to go and associate to the one suggested to it.

In an example of some existing chipsets of UE 64, there may be thereof an active data connection with AP 65. That is, the UE may have an application that is receiving or emitting data and because of that ongoing communication the UE may not want to leave the connection and change APs (e.g., even with roaming enabled). Without knowing when the communication is done, this may raise difficulty in exploiting that UE. To get it to change APs in the nearer term, authentication component 40 may emit the de-authentication PDU to that UE to cause it to switch APs substantially soon.

In some embodiments, system 10 may provide supportive actions during an active cyber security threat. For example, the system may be monitoring network 70 for threats. Once a threat has been detected, monitoring component 32 may identify an affected/targeted UE 64. This or another component of processor 20 may update its AP based on the level of threat, or allow the AP to remain and actively monitor the user device/AP in safe mode for data analytics.

Figure 5:
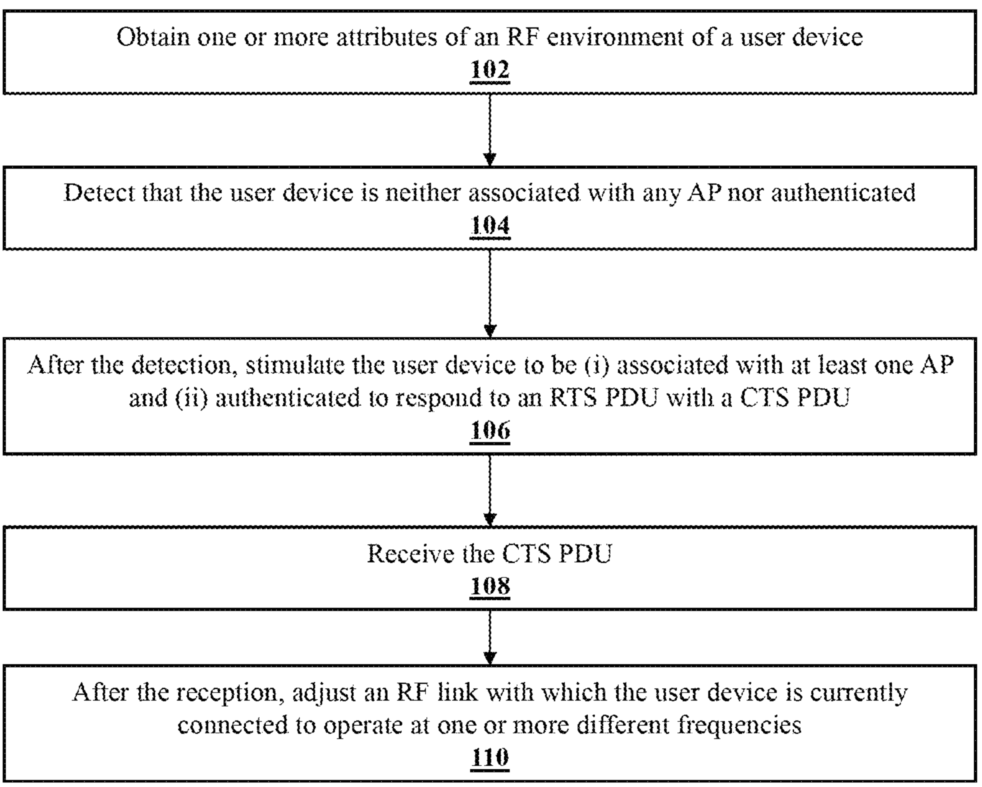
FIG. 5 illustrates a process for link manipulation, in accordance with one or more embodiments.
Figure 6:
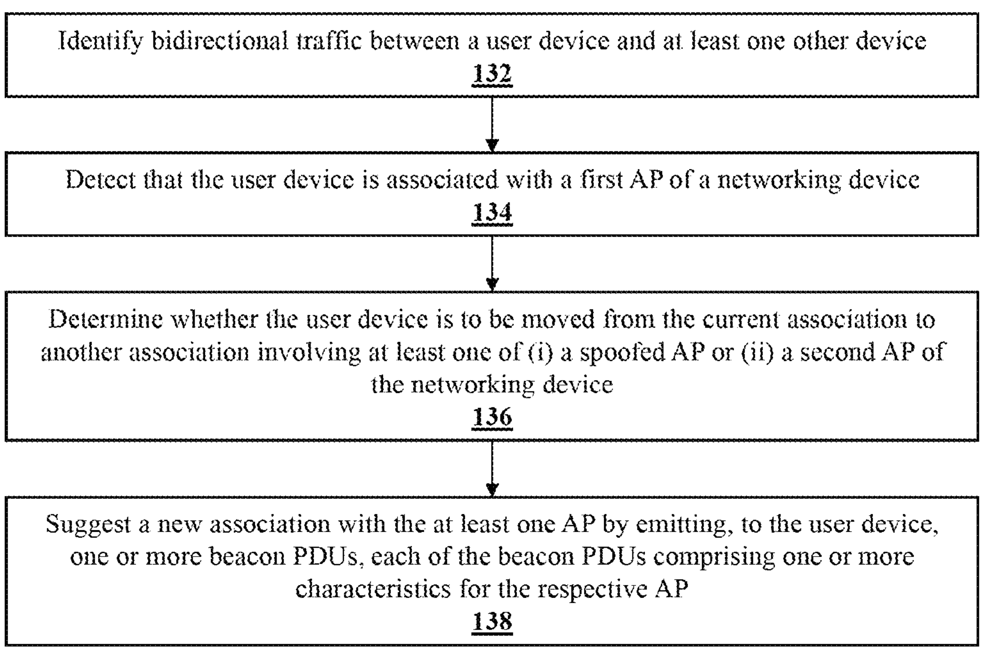
FIG. 6 illustrates another process for link manipulation, in accordance with one or more embodiments.
Figure 7:
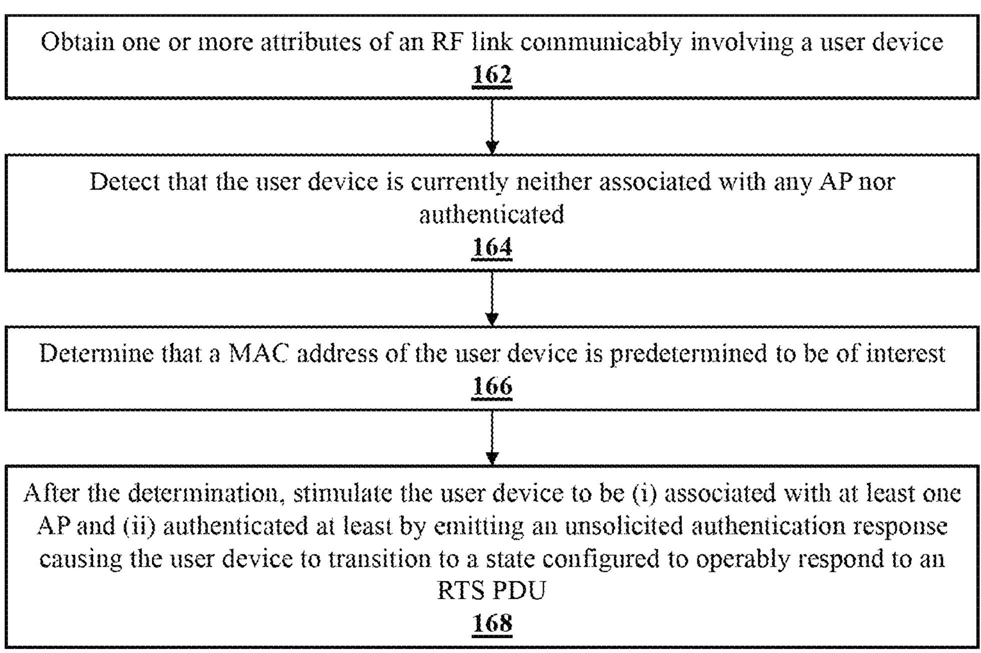
FIG. 7 illustrates another process for link manipulation, in accordance with one or more embodiments.

FIGS. 5-7 illustrate methods 100, 130, and 160 for initiating an AP connection for a device by actively causing the device to transmit information subsequently arrangeable for OCO, in accordance with one or more embodiments. For example, system 10 may perform active collection or set up a rogue AP to which the UE may connect for collecting more of their data. Methods 100, 130, and 160 may each be performed with a computer system comprising one or more computer processors and/or other components. The processors are configured by machine readable instructions to execute computer program components. The operations of methods 100, 130, and 160 presented below are intended to be illustrative. In some embodiments, methods 100, 130, and 160 may each be accomplished with one or more additional operations not described, and/or without one or more of the operations discussed. Additionally, the order in which the operations of methods 100, 130, and 160 are illustrated in FIGS. 5-7 and described below is not intended to be limiting. In some embodiments, methods 100, 130, and 160 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of methods 100, 130, and 160 in response to instructions stored electronically on an electronic storage medium. The processing devices may include one or more devices configured through hardware, firmware, and/or software to be specifically designed for execution of one or more of the operations of methods 100, 130, and 160.

At operation 102 of method 100, one or more attributes of an RF environment of a user device may be obtained, as mentioned. In some embodiments, operation 102 is performed by a processor component the same as or similar to information component 30 and/or monitoring component 32 (shown in FIG. 1 and described herein).

At operation 104 of method 100, a detection may be performed as to whether the user device is associated with any AP or authenticated, as mentioned. In some embodiments, operation 104 is performed by a processor component the same as or similar to detection component 34 (shown in FIG. 1 and described herein).

At operation 106 of method 100, the user device may be stimulated to be (i) associated with at least one AP and (ii) authenticated to respond to an RTS PDU with a CTS PDU, after the detection (as mentioned). In some embodiments, operation 106 is performed by a processor component the same as or similar to detection component 34 (shown in FIG. 1 and described herein).

At operation 108 of method 100, the CTS PDU may be received, as mentioned. In some embodiments, operation 108 is performed by a processor component the same as or similar to detection component 34 (shown in FIG. 1 and described herein).

At operation 110 of method 100, an RF link, via which the user device is currently connected, may be adjusted to operate at one or more different frequencies, after the reception (as mentioned). In some embodiments, operation 110 is performed by a processor component the same as or similar to link management component 42 (shown in FIG. 1 and described herein).

At operation 132 of method 100, bidirectional traffic between a user device and at least one other device may be identified, as mentioned. In some embodiments, operation 132 is performed by a processor component the same as or similar to monitoring component 32 (shown in FIG. 1 and described herein).

At operation 134 of method 100, whether the user device is associated with a first AP of a networking device may be detected, as mentioned. In some embodiments, operation 134 is performed by a processor component the same as or similar to monitoring component 32 (shown in FIG. 1 and described herein).

At operation 136 of method 100, whether the user device is to be moved from the current association to another association, involving at least one of (i) a spoofed AP or (ii) a second AP of the networking device, may be determined (as mentioned). In some embodiments, operation 136 is performed by a processor component the same as or similar to probe component 36 (shown in FIG. 1 and described herein).

At operation 138 of method 100, a new association with the at least one AP may be suggested by emitting, to the user device, one or more beacon PDUs, each comprising one or more characteristics for the respective AP, as mentioned. In some embodiments, operation 138 is performed by a processor component the same as or similar to beacon component 38 (shown in FIG. 1 and described herein).

At operation 162 of method 100, one or more attributes of an RF link, communicably involving a user device, may be obtained (as mentioned). In some embodiments, operation 162 is performed by a processor component the same as or similar to monitoring component 32 (shown in FIG. 1 and described herein).

At operation 164 of method 100, whether the user device is currently associated with any AP or authenticated may be detected, as mentioned. In some embodiments, operation 164 is performed by a processor component the same as or similar to monitoring component 32 (shown in FIG. 1 and described herein).

At operation 166 of method 100, whether a MAC address of the user device is predetermined to be of interest may be determined, as mentioned. In some embodiments, operation 166 is performed by a processor component the same as or similar to information component 30 (shown in FIG. 1 and described herein).

At operation 168 of method 100, the user device may be stimulated to be (i) associated with at least one AP and (ii) authenticated at least by emitting an unsolicited authentication response, causing the user device to transition to a state configured to operably respond to an RTS PDU, after the determination (as mentioned). In some embodiments, operation 168 is performed by a processor component the same as or similar to detection component 34 and/or authentication component 40 (shown in FIG. 1 and described herein).

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. A computer may also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the disclosure are specifically illustrated and/or described herein. However, it will be appreciated that modifications and variations are contemplated and within the purview of the appended claims.

What is claimed is:

1. A computer-implemented method, comprising:

obtaining one or more attributes of a radiofrequency (RF) environment of a user device;

detecting that the user device is neither associated with any access point (AP) nor authenticated;

after the detection, stimulating the user device to be (i) associated with at least one AP and (ii) authenticated to respond to a ready-to-send (RTS) protocol data unit (PDU) with a clear-to-send (CTS) PDU;

receiving the CTS PDU;

after the reception, adjusting an RF link with which the user device is currently connected to operate at one or more different frequencies; and obtaining, from the user device, a first probe request indicating non-association, the first probe request comprising an extractable service set identification (SSID) of the at least one AP.

2. The method of claim 1, further comprising:

emitting a first probe response including the SSID; and obtaining, at a computer performing the implementation in a predetermined time period after the first probe response is emitted, an authentication request, wherein the stimulation causes the user device to emit the authentication request.

3. The method of claim 2, further comprising:

responsive to the obtained authentication request, emitting an authentication response to a medium access control (MAC) address of the user device.

4. The method of claim 1, further comprising:

responsive to an authentication request not being obtained in a predetermined time period after a first probe response is emitted, monitoring receipt of a second probe request from the user device.

5. The method of claim 1, further comprising:

broadcasting one or more beacon PDUs comprising association information involving an AP with which the user device is previously determined to have been associated; and after the broadcast, obtaining, from the user device, at least one of a probe request for the previously determined association or an authentication request.

6. The method of claim 1, further comprising:

obtaining, from the user device, an association request; and responsive to the obtained request, generating and emitting an association response.

7. The method of claim 1, further comprising:

before the stimulation is performed, determining whether a link involving the user device is operably capable of being at least one of maintained or established based on the one or more attributes.

8. The method of claim 1, wherein the adjustment causes a cyber operation to be performed at a greater level of reliability by extending a range of the connection of the user device notwithstanding reduction in throughput of the connection.

9. A computer-implemented method, comprising:

obtaining one or more attributes of an RF link communicably involving a user device;

detecting that the user device is currently neither associated with any AP nor authenticated;

determining that a MAC address of the user device is predetermined to be of interest; and after the determination, stimulating the user device to be (i) associated with at least one AP and (ii) authenticated at least by emitting an unsolicited authentication response causing the user device to transition to a state configured to operably respond to an RTS PDU.

10. The method of claim 9, further comprising:

confirming that the user device (i) is in a specified region and/or (ii) has a signal strength satisfying at least one criterion based on the one or more obtained attributes.

11. The method of claim 9, wherein the RF link comprises a Wi-Fi connection.

12. A computer-implemented system, comprising:

a non-transitory memory including instructions stored;

a processor operably coupled to the non-transitory memory and configured to execute one or more of the stored instructions comprising:

obtaining one or more attributes of a radiofrequency (RF) environment of a user device;

detecting that the user device is neither associated with any access point (AP) nor authenticated wherein the detection includes obtaining, from the user device, a first probe request indicating non-association, and wherein the first probe request comprises an extractable service set identification (SSID) of the at least one AP;

after the detection, stimulating the user device to be (i) associated with at least one AP and (ii) authenticated to respond to a ready-to-send (RTS) protocol data unit (PDU) with a clear-to-send (CTS) PDU;

receiving the CTS PDU; and adjusting an RF link with which the user device is currently connected to operate at one or more different frequencies after the reception.

13. The computer-implemented system of claim 12, wherein the processor is further configured to execute the instructions of:

emitting a first probe response including the SSID; and obtaining, at a computer performing the implementation in a predetermined time period after the first probe response is emitted, an authentication request, wherein the stimulation causes the user device to emit the authentication request.

14. The computer-implemented system of claim 13, wherein the processor is further configured to execute the instructions of emitting an authentication response to a medium access control (MAC) address of the user device responsive to the obtained authentication request.

15. The computer-implemented system of claim 12, wherein the processor is further configured to execute the instructions of monitoring receipt of a second probe request from the user device responsive to an authentication request not being obtained in a predetermined time period after a first probe response is emitted.

16. The computer-implemented system of claim 12, wherein the processor is further configured to execute the instructions of:

broadcasting one or more beacon PDUs comprising association information involving an AP with which the user device is previously determined to have been associated; and obtaining, from the user device, at least one of a probe request for the previously determined association or an authentication request after the broadcast.

17. The computer-implemented system of claim 12, wherein the processor is further configured to execute the instructions of:

obtaining, from the user device, an association request; and responsive to the obtained request, generating and emitting an association response.

18. The computer-implemented system of claim 12, wherein the processor is further configured to execute the instructions of determining whether a link involving the user device is operably capable of being at least one of maintained or established based on the one or more attributes before the stimulation is performed.

* * * * *